(12) United States Patent
Bennett

(10) Patent No.: US 8,925,265 B2
(45) Date of Patent: *Jan. 6, 2015

(54) ENCAPSULANTS FOR WINDOW ASSEMBLIES

(71) Applicants: AGC Automotive Americas R&D, Inc, Ypsilanti, MI (US); AGC Flat Glass North America, Inc., Alpharetta, GA (US)

(72) Inventor: Daniel Bennett, Tecumseh, MI (US)

(73) Assignee: AGC Automotive Americas R&D, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,063

(22) Filed: Jun. 26, 2014

(65) Prior Publication Data

US 2014/0305051 A1     Oct. 16, 2014

Related U.S. Application Data

(63) Continuation of application No. 13/728,397, filed on Dec. 27, 2012, now Pat. No. 8,800,222.

(51) Int. Cl.
*E06B 7/00* (2006.01)
*E06B 3/62* (2006.01)
*E06B 3/673* (2006.01)

(52) U.S. Cl.
CPC .............. *E06B 3/62* (2013.01); *E06B 3/6733* (2013.01); *E06B 2003/627* (2013.01); *E06B 2003/6258* (2013.01)
USPC ............... 52/204.597; 52/204.71; 52/308; 52/788.1; 52/741.1

(58) Field of Classification Search
USPC ............ 52/788.1, 171.3, 204.591, 204.64, 52/204.53, 204.71, 204.597, 308, 741.1; 428/68, 70, 76; 156/108; 296/146.15, 296/93; 49/501

See application file for complete search history.

(56) References Cited

U.S. PATENT DOCUMENTS

| 4,707,958 A | 11/1987 | Armbruster |
|---|---|---|
| 4,712,287 A | 12/1987 | Johnston |
| 4,942,704 A | 7/1990 | King |

(Continued)

FOREIGN PATENT DOCUMENTS

| CN | 100577762 C | 1/2010 |
|---|---|---|
| EP | 857116 B1 | 1/2002 |

(Continued)

OTHER PUBLICATIONS

International Search Report for Application No. PCT/US2013/078072, dated Apr. 22, 2014, 5 pages.

(Continued)

*Primary Examiner* — Chi Q Nguyen
(74) *Attorney, Agent, or Firm* — Howard & Howard Attorneys PLLC

(57) ABSTRACT

A window assembly includes a transparent pane and an encapsulant bonded to the transparent pane, wherein the encapsulant is a copolymer of at least one amorphous thermoplastic polymer and at least one crystalline thermoplastic polymer, wherein the at least one amorphous thermoplastic polymer is at least one thermoplastic polyester, at least one thermoplastic polyether, or a copolymer of at least one thermoplastic polyester and at least one thermoplastic polyether. The at least one crystalline thermoplastic polymer may be a renewably-sourced thermoplastic polymer, wherein the total weight of the renewably-sourced thermoplastic polymer is at most 60 percent of the total weight of the copolymer.

13 Claims, 2 Drawing Sheets

(56) References Cited

U.S. PATENT DOCUMENTS

| | | |
|---|---|---|
| 5,614,051 A | 3/1997 | Fisher et al. |
| 5,635,281 A | 6/1997 | Agrawal |
| 6,001,204 A | 12/1999 | Halg et al. |
| 6,105,973 A | 8/2000 | Butler et al. |
| 6,134,851 A | 10/2000 | Roze et al. |
| 6,203,639 B1 | 3/2001 | Swanson et al. |
| 6,546,683 B1 | 4/2003 | Senge |
| 6,599,386 B2 | 7/2003 | Swanson et al. |
| 7,210,729 B2 | 5/2007 | Hammaker et al. |
| 2002/0060445 A1 | 5/2002 | Shirk et al. |
| 2005/0091935 A1 | 5/2005 | Amano et al. |
| 2007/0031644 A1 | 2/2007 | Kasahara et al. |
| 2009/0123640 A1 | 5/2009 | Suzuki |
| 2009/0293368 A1 | 12/2009 | Repp et al. |
| 2010/0146883 A1 | 6/2010 | Benkel |
| 2010/0273008 A1 | 10/2010 | Burckhardt |
| 2011/0143113 A1 | 6/2011 | Hatta et al. |

FOREIGN PATENT DOCUMENTS

| | | |
|---|---|---|
| EP | 1712604 A1 | 10/2006 |
| EP | 181381 A1 | 8/2007 |
| EP | 2062926 A1 | 5/2009 |
| EP | 2069829 B1 | 7/2011 |
| JP | H 11-246682 A | 9/1999 |
| WO | WO 99/16618 A1 | 4/1999 |
| WO | WO 2009/146742 A1 | 12/2009 |
| WO | WO 2012015936 A1 | 2/2012 |

OTHER PUBLICATIONS

English language abstract for EP 2 062 926 extracted from espacenet.com database on May 5, 2014, 44 pages.

English language abstract and machine-assisted English translation for JPH 11-246682 extracted from PAJ database on May 5, 2014, 29 pages.

English language abstract and machine-assisted English translation for CN 100577762 extracted from espacenet.com database on Feb. 15, 2013; 27 pages.

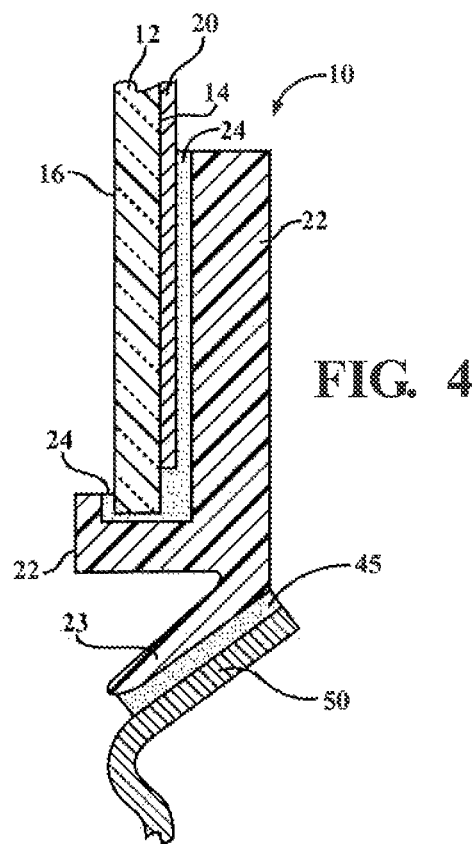
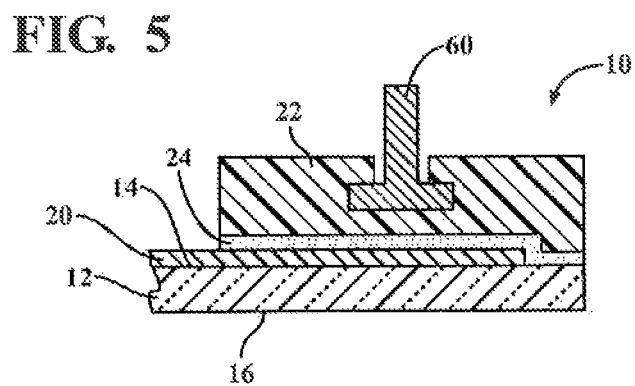

ENCAPSULANTS FOR WINDOW ASSEMBLIES

CROSS-REFERENCE TO RELATED APPLICATIONS

This is a continuation application of a non-provisional application Ser. No. 13/728,397, filed on Dec. 27, 2012 and incorporated by reference herein in its entirety.

BACKGROUND OF THE INVENTION

1. Field of the Invention

The present invention generally relates to encapsulants for use in window assemblies.

2. Description of the Related Art

Polymeric encapsulants for window assemblies are generally known in the art. Generally, window assemblies include a transparent pane, commonly made from glass. A ceramic frit is typically disposed about a perimeter of the transparent pane by methods commonly known in the art, like printing the ceramic frit on the transparent pane. The polymeric encapsulant is bonded to the perimeter of the transparent pane. The encapsulant can be bonded to one, two, or three surfaces of the transparent pane, and is typically bonded to the transparent pane via a primer. Said differently, the encapsulant bonds to the primer, which is bonded to the transparent pane, thereby bonding the encapsulant to the transparent pane.

Generally, the encapsulant can be either a thermoset material or a thermoplastic material. Exemplary thermosetting materials include, for example, a reaction injection molded (RIM) material, while exemplary thermoplastic polymer include materials such as polyvinylchloride (PVC) or a thermoplastic elastomer (TPE). While such conventional thermosetting or thermoplastic encapsulants are generally suitable for their intended purpose, they do suffer from a variety of known deficiencies.

For example, in prior art window assemblies utilizing conventional encapsulants such as TPE, it was generally not thought possible to seal the window assembly to the vehicle body by application of an adhesive material directly to the encapsulant because the adhesive material would not bond to such encapsulant. As a result, to couple the window assembly to the vehicle body, depending upon the type of polymer utilized, the adhesive material was applied to an exposed portion of the transparent pane and coupled to the vehicle body. Alternatively, metallic studs concealed within the encapsulant could be utilized. As one of ordinary skill would appreciate, such an arrangement limits the possible design variations for window assemblies, as a portion of the transparent pane located in close proximity to the vehicle body would necessarily need to be available for adhesive bonding.

In addition, conventional encapsulants such as TPE are generally not thought to be structural in nature. Thus, they are not strong enough to support or encapsulate window assembly support members, such as studs or rails. This also may limit possible design choices for window assemblies.

Further, conventional encapsulants such as RIM are relatively expensive to produce, requiring significant capital expense in terms of production equipment. In addition, there are also costs associated with the handling potentially hazardous components such as isocyanates used to form RIM encapsulants.

While PVC encapsulants are relatively inexpensive to produce, they are also chlorinated and thus are not considered environmentally friendly. In addition, special handling may be required with respect to recycling.

The present invention addresses many of these known deficiencies.

SUMMARY OF THE INVENTION AND ADVANTAGES

A window assembly includes a transparent pane and an encapsulant bonded to the transparent pane, wherein the encapsulant comprises a copolymer of at least one amorphous thermoplastic polymer and at least one crystalline thermoplastic polymer.

The present invention also discloses a method of manufacturing a window assembly by applying an encapsulation composition comprising a copolymer of at least one amorphous thermoplastic polymer and at least one crystalline thermoplastic polymer to a transparent pane.

The window assembly including the aforementioned encapsulant bonded to the transparent pane offers advantages over conventional thermosetting or thermoplastic encapsulants in terms of peel strength and Shore A hardness. In addition, the encapsulants of the present invention allow for the application of a urethane primer and an adhesive material to the encapsulant that allows the window assembly to be contacted and sealed to a vehicle body when the window assembly is utilized on a vehicle without the use of auxiliary fasteners. In addition, the encapsulant formed from an encapsulation composition comprising the copolymer of an amorphous thermoplastic polymer and a crystalline thermoplastic polymer is itself structural in nature, and thus allows for one or more support members typically included in a window assembly application to be coupled to the transparent pane without the need for clips or other fasteners or adhesives. Also, such encapsulants are formed from environmentally friendlier components, are relatively inexpensive to produce, and form aesthetically pleasing encapsulants for use in window assemblies.

BRIEF DESCRIPTION OF THE DRAWINGS

Other advantages of the present invention will be readily appreciated, as the same becomes better understood by reference to the following detailed description, when considered in connection with the accompanying drawings wherein:

FIG. 4 is a cross-sectional view of a transparent pane of a window assembly showing the primer bonding a three-sided encapsulant to the transparent pane and showing the window assembly bonded to the vehicle body; and FIG. 5 is a cross-sectional view of a transparent pane of a window assembly showing a primer bonding a one-sided encapsulant to the transparent pane and showing a structural support member coupled within the encapsulant.

DETAILED DESCRIPTION OF THE INVENTION

Referring to the Figures, wherein like numerals indicate like or corresponding parts throughout the several views, a window assembly is generally shown at 10. The window assembly 10 is suitable for use in a vehicle, for example vent windows and quarter windows, as well as vertical and horizontal sliding windows. Additionally, it is to be appreciated that the window assembly 10 may also be implemented in non-vehicle applications.

Figure 1:
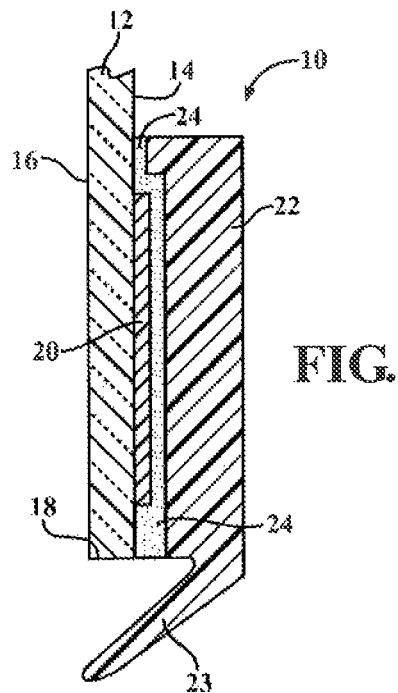
FIG. 1 is a cross-sectional view of a transparent pane of a window assembly showing a primer bonding a one-sided encapsulant to the transparent pane.
Figure 2:
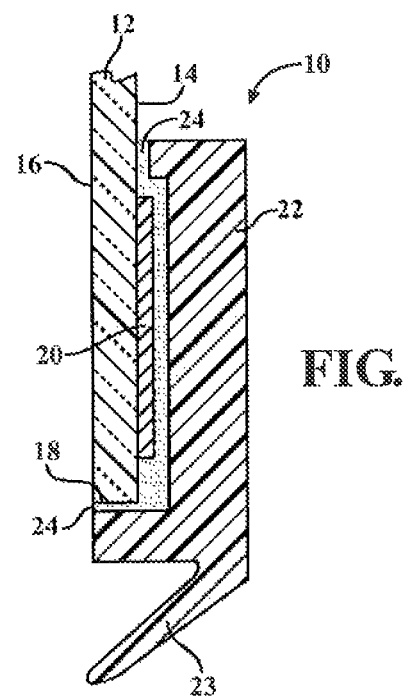
FIG. 2 is a cross-sectional view of the transparent pane of the window assembly showing the primer bonding a two-sided encapsulant to the transparent pane.
Figure 3:
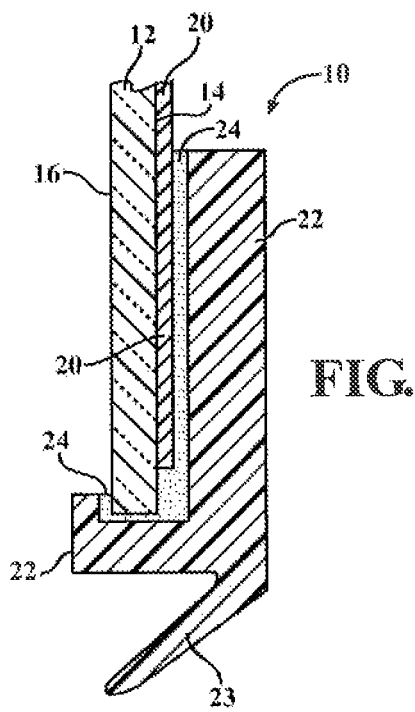
FIG. 3 is a cross-sectional view of the transparent pane of the window assembly showing the primer bonding a three-sided encapsulant to the transparent pane.

With reference to FIGS. 1-3, the window assembly 10 includes a transparent pane 12, also commonly referred to as a glazing, having a first surface 14 and a second surface 16 spaced from and opposite to the first surface 14. It is to be appreciated that the transparent pane 12, as described herein, may be partially or completely transparent and may even be tinted to various levels such that the transparent pane 12 may be opaque. The transparent pane 12 is not required to be completely transparent. The transparent pane 12 further includes an edge 18, with the edge 18 defining a perimeter of the transparent pane 12. The edge 18 is between and connects the first surface 14 and the second surface 16.

The transparent pane 12 is typically glass, more typically soda-lime glass. However, it is to be appreciated that the transparent pane 12 may be other types of glass, including non-tempered glass or tempered glass, non-laminated glass or laminated glass, or any polymeric material known in the art.

An encapsulant 22 is bonded to the transparent pane 12. Typically, the encapsulant 22 is bonded to the perimeter of the transparent pane 12 on the first surface 14. Generally, the encapsulant 22 couples the window assembly 10 to the vehicle. The encapsulant 22 has a seal 23 for sealing between the window assembly 10 and the vehicle. The seal 23 of the encapsulant 22 allows for a seamless transition from the edge 18 of the transparent pane 12 to sheet metal of the vehicle. Furthermore, locator clips/pins may be attached to the transparent pane 12 via overmolding of the encapsulant 22 for assisting with proper placement of the transparent pane 12 on the vehicle. The encapsulant 22 also protects the edge 18 of the transparent pane 12 from breaking. The coupling of the encapsulant 22 to the transparent pane 12 results in a bond strength between the encapsulant 22 and the transparent pane 12.

As shown in FIG. 1, the encapsulant 22 may be a one-sided encapsulant. However, it is to be appreciated that the encapsulant 22 may alternatively be a two-sided encapsulant, as shown in FIG. 2, or a three-sided encapsulant, as shown in FIG. 3. When the encapsulant 22 is bonded to a single surface, such as the first surface 14 or the second surface 16 of the transparent pane 12, it is generally referred to in the art as the one-sided encapsulant. When the encapsulant 22 is bonded to the edge 18 and either of the first surface 14 or the second surface 16 of the transparent pane 12, it is generally referred to in the art the two-sided encapsulant. When the encapsulant 22 is bonded to the first surface 14, the second surface 16 and the edge 18 of the transparent pane 12, it is generally referred to in the art as the three-sided encapsulant.

In certain embodiments, the encapsulant 22 is a thermoplastic polymer formed from an encapsulation composition comprising at least one amorphous thermoplastic polymer and at least one crystalline thermoplastic polymer. Stated differently, the encapsulant 22 is a thermoplastic polymer that is the reaction product of reactants of an encapsulation composition comprising at least one amorphous thermoplastic polymer and at least one crystalline thermoplastic polymer. Stated still another way, the encapsulant 22 is a copolymer of at least one amorphous thermoplastic polymer and at least one crystalline thermoplastic polymer. The encapsulant 22 therefore includes crystalline segments (i.e., hard segments) and amorphous segment (i.e., soft segments).

In certain embodiments, the encapsulant 22 according to the present invention has a peel strength of up to 500 N (Newtons), such as from 250 to 500 N, at ambient and wet conditions, as determined in accordance with ASTM D1876-08 (with a cross head speed of 50 mm/min (rate of peel)), well above peel strengths of about 130 N for conventional TPE-based encapsulants and about 200 N for conventional PVC-based encapsulants. In addition, the encapsulant 22 has a Shore A hardness of at least 60, such as from 65 to 80. In certain of these embodiments, the encapsulant 22 according to the present invention has a weight average molecular weight ($M_w$) of at least 100,000, such as at least one million, as measured by GPC (gel permeation chromatography) or SEC (size exclusion chromatography).

In certain embodiments, the at least one amorphous thermoplastic polymer comprises (a) at least one amorphous thermoplastic polyester, (b) at least one amorphous thermoplastic polyether, or (c) a copolymer of at least one amorphous thermoplastic polyester and at least one amorphous thermoplastic polyether. Exemplary amorphous thermoplastic polyethers that may be used include aromatic polyethers or aliphatic polyethers such as polyoxyalkylene glycols, including, for example polyoxyethylene glycol and polyoxypropylene glycol. Exemplary amorphous thermoplastic polyesters that may be used generally include naturally-occurring or synthetically produced thermoplastic polyesters and may be homopolymers or copolymers of aliphatic polyesters, semi-aromatic polyesters, and/or aromatic polyesters. The polyesters may be linear or branched in nature. A non-exhaustive list of thermoplastic polyesters that may be utilized include polyethyleneadipate, polytetramethyleneadipate, polyneopentylsebacate, polyhexamethyleneacetate, and combinations thereof.

In certain embodiments, the at least one crystalline thermoplastic polymer comprises at least one renewably-sourced thermoplastic polymer that is crystalline in nature. A renewably-sourced polymeric material, as defined herein, is a polymeric material that is generated or derived at least in part from renewable resources. A renewable resource is a natural resource with the ability to reproduce through biological or natural processes and replenished with the passage of time. A renewably-sourced thermoplastic polymer therefore is a thermoplastic polymeric material that is generated or derived, at least in part, from renewable resources. Stated another way, the renewably-sourced thermoplastic polymer is a thermoplastic polymer that is not generated entirely from petroleum hydrocarbons.

In certain embodiments, the at least one crystalline thermoplastic polymer comprises at least one crystalline thermoplastic polyester. In certain of these embodiments, the at least one crystalline thermoplastic polyester is at least one renewably-sourced thermoplastic polyester that is crystalline in nature. One exemplary renewably-sourced thermoplastic polyester that may be utilized in the encapsulant composition to form the encapsulant 22 is a polyhydroxyalkanoate (PHA) resin. Polyhydroxylalkanoates are linear polyesters that may be produced in nature by bacterial fermentation of sugar or lipids.

In certain embodiments, the PHA resin is a homopolymer or copolymer of one or more hydroxyalkanoate monomer repeating units. Examples of hydroxyalkanoate monomers suitable for use in forming the PHA homopolymers and copolymers are 3-hydroxyalkanoates such as 3-hydroxybutyrate, 3-hydroxyvalerate, and 3-hydroxyoctanoate, 4-hydroxyalkanoates such as 4-hydroxybutyrate, 5 hydroxyalkanoates such as 5-hydroxyvalerate and 5-hydroxycaproate, and 6-hydroxyalkanoates such as 6-hydroxycaproate, 6-hydroxycaprylate, and 6-hydroxypropionate.

In certain embodiments, wherein the encapsulant 22 is a copolymer that includes at least one renewably-sourced thermoplastic polyester such as PHA, the copolymer includes, at most, 60% by weight of the at least one renewably-sourced thermoplastic polyester. Stated another way, the at least one renewably-sourced thermoplastic polyester component of the copolymer comprises, at most, 60% of the total weight of the copolymer.

One exemplary encapsulant 22 is a copolymer of at least one amorphous thermoplastic polyether and at least one crystalline thermoplastic polyester that may be used is the so-called Hytrel® RS thermoplastic elastomers, such as, for example, Hytrel® TPC-Et thermoplastic polyester elastomers, available from DuPont, and containing between 20% and 60% renewably-sourced material. Hytrel® RS thermoplastic elastomers are made using renewably-sourced polyol derived from plant feedstock. Another exemplary encapsulant 22 is a copolymer of at least one amorphous thermoplastic polyether and at least one crystalline thermoplastic polyester that may be used is Riteflex® TPE-E (thermoplastic elastomer-ester) thermoplastic elastomers, available from Ticona.

In certain embodiments, as also shown in FIGS. 1-3, a ceramic frit 20 may be disposed on the transparent pane 12. Typically, the ceramic frit 20 is disposed on the first surface 14 of the transparent pane 12. The ceramic frit 20 is bonded to the transparent pane 12 by known methods, such as printing and in such methods the transparent pane 12 may be referred to as a printed assembly. The ceramic frit 20 may present a uniform border around the perimeter of the transparent pane 12, thereby enhancing an aesthetic appearance of the window assembly 10. The ceramic frit 12 may also protect the urethane bead utilized to couple the window assembly 10 to the vehicle. It is to be appreciated that the ceramic frit 20 may be omitted from the transparent pane 12. If the ceramic frit 20 is omitted, the transparent pane 12 is known in the art as a non-printed assembly. The ceramic frit 20 may be spaced from the edge 18 of the transparent pane 12, such that a portion of the first surface 14 of the transparent pane 12 is exposed between the ceramic frit 20 and the edge 18 of the transparent pane 12. Additionally, the primer 24 may be disposed on the ceramic frit 20 such that the ceramic frit 20 is between the primer 24 and the transparent pane 12.

Generally, the ceramic frit 20 is opaque to absorb solar energy and impede the solar energy from penetrating the window assembly 10 and negatively affecting chemical and physical properties of the primer 24, which can negatively affect the bond strength between the encapsulant 22 and the transparent pane 12. Additionally, the primer 24 may include UV additives to impede solar energy from penetrating the window assembly 10 and negatively affecting chemical and physical properties of the encapsulant 22 and/or the primer 24.

Typically, the primer 24 is coupled to at least one of the transparent pane 12 and the ceramic frit 20 for providing a bonding surface on the transparent pane 12. Generally, the encapsulant 22 is bonded to the bonding surface provided by the primer 24 for bonding the encapsulant 22 to the transparent pane 12. Said differently, the encapsulant 22 bonds to the primer 24, which is bonded to the transparent pane 12, thereby bonding the encapsulant 22 to the transparent pane 12. The primary bonding of the encapsulant 22 to the transparent pane 12 via the primer 24 is also known as adhesive bonding, wherein the polymeric material of the encapsulant 22 is entangled with the polymeric material of the primer 24. In certain embodiments, the material comprising the encapsulant (i.e., the encapsulation composition) may also chemically react with the material comprising the primer 24 to form a chemical bond. The primer 24 may increase the bond strength between the encapsulant 22 and the transparent pane 12 as compared to possible bond strengths directly between the encapsulant 22 and the transparent pane 12 without the primer 24. Said differently, the encapsulant 22 may bond better to the primer 24 than it would bond with the transparent pane 12 directly.

Although the encapsulant 22 is bonded to the primer 24, the primer may still be visible when the window assembly 10 is viewed. For example, the primer 24 may extend beyond the encapsulant 22. Additionally, because the primer 24 is sandwiched between the transparent pane 12 and the encapsulant 22, the primer 24 may be visible when the window assembly 10 is viewed at an angle. Furthermore, the primer 24 and the ceramic frit 20 may be visible through the transparent pane 12 when the ceramic frit 20 and primer 24 are only disposed on side of the transparent pane 12.

A composition of the primer 24 is dependent on the composition of the encapsulant 22. In certain embodiments, the primer 24 comprises polypropylene. More specifically, in certain embodiments, the primer 24 comprises a modified polypropylene, such as polypropylene with polar functional groups. For example, the modified polypropylene may be a halogenated polypropylene. However, it is to be appreciated that any modified polypropylene may be used.

In certain embodiments, the primer 24 is a chlorine-free adhesive composition for use in the adhesion of the encapsulant to the transparent pane 12. In certain of these embodiments, the primer 24 comprises a modified polyolefin obtained by graft-copolymerizing at least one member selected from an α,β-unsaturated carboxylic acid and an acid anhydride thereof, to a propylene-α-olefin copolymer, such as described in U.S. Patent Publication No. 20070031644 to Kashahara et al., now abandoned, which is herein incorporated by reference in its entirety.

For example, one advantage of the encapsulant 22 is best illustrated in FIG. 4, wherein a primer and an adhesive material, such as a urethane primer and a urethane adhesive material, are applied directly to the encapsulant 22 to form an adhesive layer 45 that is also contacted and sealed to the vehicle body 50. Stated differently, the adhesive layer 45 is disposed upon the encapsulant 22 opposite the transparent pane 12. By contrast, in prior art window assemblies, the adhesive material could not be applied directly to the conventional encapsulant materials because they would not bond to such encapsulant materials. Thus, to seal the window assembly to the vehicle body when utilizing conventional encapsulants such as TPE, the adhesive material was applied to an exposed portion of the transparent pane and coupled to the vehicle body. As one of ordinary skill would appreciate, such an arrangement limits the possible design variations for window assemblies, as a portion of the transparent pane located in close proximity to the vehicle body would necessarily need to be available for adhesive bonding. The use of the new encapsulant 22 of the present invention therefore provides additional design choices for forming and adhering the window assembly 10 to the vehicle body 50 than previously possible.

The encapsulant 22 of the present invention also may act as a structural adhesive and well as an encapsulant. Thus, in certain other embodiments, as shown in FIG. 5, the window assembly 10 may also include one or more support members 60, such as studs or rails (the support member 60 illustrate in FIG. 5 is a t-shaped stud), that are either contained within (i.e., the support member 60 is completely encapsulated within the encapsulant 22) or otherwise contacted on at least one side with the encapsulant 22. The encapsulant 22 structurally supports the support member 60 in relative relation to the transparent pane 12. Thus, the encapsulant 22 of the present invention may limit or eliminate the need for clips or other fasteners and adhesives that are typically utilized to affix the support members 60 to the transparent pane 12. Moreover, the encapsulant 22 may disguise or conceal the support members 60, thus providing for more aesthetically pleasing window assembly designs.

Application

The transparent pane 12 is typically received at a production facility as the printed assembly, i.e., with the ceramic frit 20 already bonded thereto, as described above. As indicated above, it is to be appreciated that the transparent pane 12 may be either non-tempered or tempered glass, and may be non-laminated or laminated. During production, the primer 24 may be applied to the ceramic frit 20, the edge 18 and, if appropriate, to the portion of the transparent pane 12 exposed between the ceramic frit 20 and the edge 18 of the printed assembly. Depending on whether the window assembly 10 will include a one-sided, a two-sided, or a three-sided encapsulant 22, additional primer 24 may be added to the transparent pane 12. Typically, the primer 24 is applied using a felt applicator brush, either manually or in an automated process via a robotic arm. It is to be appreciated that the primer 24 may also be applied using any other suitable method of application.

Typically, the primer 24 is applied to the first surface 14 of the transparent pane 12 and around the edge 18 of the transparent pane 12, such that it appears that the primer 24 wraps around the edge 18 of the transparent pane 12. After the primer 24 has cured on the transparent pane 12 (by flashing the primer 24 to remove solvent and optionally heating the primer 24), the transparent pane 12 is placed into a die cavity, along with any associated support members 60 (where utilized) positioned relative to the transparent pane 12. The die cavity is then closed. The encapsulation composition for forming the encapsulant 22 is then injected into the die cavity in a molten state. During the formation of the encapsulant 22, the encapsulation composition cools and bonds to the transparent pane 12. More specifically, during the formation of the encapsulant 22, the encapsulation composition cools and is entangled (i.e., physically interacting) with the polymeric material of the primer 24 that has been bonded either directly to the transparent pane 12 or to the ceramic frit 20 which is bonded to the transparent pane 12. In certain embodiments, the encapsulation composition may also chemically react with the material comprising the primer 24. The encapsulant 22 also bonds to or encapsulates the support member 60 (where utilized), thereby affixing the support member 60 in a position relative to the transparent pane 12. The transparent pane 12 is removed from the die cavity.

After removal, the window assembly 10 may be coupled to a vehicle body 50. In certain embodiments, the urethane primer and adhesive are applied to the seal 23 to form the adhesive layer 45 and the window assembly 10 is contacted and sealed to the vehicle body 50 through the adhesive layer 45.

The method for forming the window assembly 10, as described above, includes the optional steps of applying both the ceramic frit 20 and primer 24 to the transparent pane 12 prior to applying the encapsulation composition. A similar method for forming the window assembly 10 in accordance with present invention, which does not include the application of a ceramic frit 20 and primer 24, is also contemplated. In this embodiment, the transparent pane 12, without the ceramic frit 20, is placed into a die cavity, along with any associated support members 60 (where utilized) positioned relative to the transparent pane 12. The encapsulation composition is then injected into the die cavity in a molten state.

During the formation of the encapsulant 22, the encapsulation composition cools and bonds to the transparent pane 12. The encapsulant 22 also bonds to or encapsulates the support member 60 (where utilized), thereby affixing the support member 60 in a position relative to the transparent pane 12. The transparent pane 12, including the encapsulant 22, is removed from the die cavity.

COMPARATIVE EXAMPLES

Transparent glass panels were prepared for evaluation of encapsulants formed in accordance with the present invention versus conventional PVC encapsulants and TPE encapsulants in accordance with the present invention. The panels were then evaluated for ambient peel strength and water resistant peel strength according to the following test procedures:

A. Sample Preparation:

Samples were creating by encapsulating a single sided of glass. The glass dimensions are 4"×6" and the encapsulant exists as two strips (1" wide) 3" in length along the short axis of the glass plaque. The encapsulant is bonded only to a single surface of glass and cantilevers off the edge of glass by 3.5". The glass plaque is printed with black ceramic and fired to simulate actual window assemblies. The black ceramic/window plaque is primed with modified polyolefin primer (AGT-3, commercially available from AGC) and then heated to 80° C. prior to encapsulation. The primed black ceramic/window plaque is transferred directly from the curing oven into the injection press mold, wherein the molten encapsulation materials described in Table 1 below are respectively injected into the mold and cooled to form the encapsulant.

B. Adhesion Strength Determination:

1. Peel Samples

The sample plaques are environmentally conditioned to simulate market conditions. High temperature water immersion, humidity resistance, heat resistance, etc are completed with varying cycle times. Adhesion strength is determined with an Instron Tensile tester. The cantilevered portion of the encapsulant is peeled at 180° (angle) from the bonded encapsulant (commonly referred to 180° peel) substantially in accordance with ASTM D1876-08. The samples are peeled at a rate of 50 mm/min at 24 hours after the completion of environment conditions. Adhesion strength (N) is recorded versus elongation (mm).

The test results for samples are illustrated in Table 1:

TABLE 1

Comparison data of Hytrel versus currently used encapsulants

| Encapsulant | Ambient Peel Strength (ASTM D1876-08 (with a cross head speed of 50 mm/min (rate of peel)) | Water Resistance Peel Strength (ASTM D1876-08 (with a cross head speed of 50 mm/min (rate of peel)) |
| --- | --- | --- |
| PVC | 200 N | 200 N |
| TPE | 130 N | 130 N |
| DuPont Hytrel ® Thermoplastic Elastomer | 500 N | 500 N |
| Riteflex ® TPE-E thermoplastic elastomers | 300 N | 300 N |

As Table 1 illustrates, the Hytrel® and Riteflex® materials exhibited significantly and surprisingly higher peel strength at ambient conditions than the conventional PVC encapsulant and TPE encapsulant. In addition, the Hytrel® and Riteflex® materials exhibited significantly and surprisingly higher water resistance peel strength.

The invention has been described in an illustrative manner, and it is to be understood that the terminology, which has been used, is intended to be in the nature of words of description rather than of limitation. It is now apparent to those skilled in the art that many modifications and variations of the present invention are possible in light of the above teachings. It is, therefore, to be understood that the invention can be practiced otherwise than as specifically described.

What is claimed is:

1. A window assembly comprising:
   a transparent pane; and
   an encapsulant bonded to said transparent pane, said encapsulant comprising a copolymer of at least one amorphous thermoplastic polymer and at least one crystalline thermoplastic polymer, wherein said at least one amorphous thermoplastic polymer comprises (a) at least one amorphous thermoplastic polyester, (b) at least one amorphous thermoplastic polyether, or (c) a copolymer of at least one amorphous thermoplastic polyester and at least one amorphous thermoplastic polyether.

2. A window assembly as set forth in claim 1 wherein said encapsulant has a peel strength of at least 250 N in accordance with ASTM D1876-08.

3. A window assembly as set forth in claim 2 wherein said encapsulant has a Shore A hardness of at least 60.

4. A window assembly as set forth in claim 1 wherein said encapsulant has a Shore A hardness of at least 60.

5. A window assembly as set forth in claim 1 further comprising an adhesive layer disposed upon said encapsulant opposite said transparent pane, said adhesive layer comprising an urethane primer and an urethane adhesive.

6. A window assembly as set forth in claim 1 further comprising at least one structural support member coupled to said transparent pane with said encapsulant.

7. A window assembly as set forth in claim 6, wherein said at least one structural support member is completely encapsulated within said encapsulant.

8. The window assembly of claim 1 further comprising a primer disposed on said transparent pane between said transparent pane and said encapsulant.

9. The window assembly of claim 8 wherein said primer comprises a modified polyolefin primer.

10. A method of manufacturing a window assembly, said method comprising:
    applying an encapsulation composition to a transparent pane to form an encapsulant on the transparent pane, the encapsulant comprising a copolymer of at least one amorphous thermoplastic polymer and at least one crystalline thermoplastic polymer, wherein said at least one amorphous thermoplastic polymer comprises (a) at least one amorphous thermoplastic polyester, (b) at least one amorphous thermoplastic polyether, or (c) a copolymer of at least one amorphous thermoplastic polyester and at least one amorphous thermoplastic polyether.

11. The method of claim 10 further comprising applying a primer on the transparent pane prior to said applying an encapsulation composition such that the primer is between the transparent pane and the encapsulant.

12. A method as set forth in claim 11 further comprising:
    positioning at least one support member relative to the transparent pane; and
    applying the encapsulation composition to the transparent pane and to the at least one support member such that the at least one support member is coupled to the transparent pane.

13. The method of claim 12 further comprising applying a primer on the transparent pane prior to said applying an encapsulation composition to the transparent pane and to the at least one support member such that the primer is between the transparent pane and the encapsulant.

\* \* \* \* \*